United States Patent
Baskin et al.

(10) Patent No.: US 10,246,208 B2
(45) Date of Patent: Apr. 2, 2019

(54) APPARATUS AND METHOD FOR AUTOMATED HANDLE INSTALLATION

(71) Applicant: Heisler Industries, Fairfield, NJ (US)

(72) Inventors: Zinovy Baskin, Wayne, NJ (US); Ronald Heisler, Mahwah, NJ (US); Richard Heisler, Fredon, NJ (US)

(73) Assignee: HEISLER MACHINE & TOOL COMPANY, Fairfield, NJ (US)

( * ) Notice: Subject to any disclaimer, the term of this patent is extended or adjusted under 35 U.S.C. 154(b) by 189 days.

(21) Appl. No.: 15/207,043

(22) Filed: Jul. 11, 2016

(65) Prior Publication Data

US 2017/0015455 A1 Jan. 19, 2017

Related U.S. Application Data

(60) Provisional application No. 62/192,226, filed on Jul. 14, 2015.

(51) Int. Cl.
| | |
|---|---|
| *B65B 61/16* | (2006.01) |
| *B65B 61/14* | (2006.01) |
| *B23P 19/04* | (2006.01) |
| *B65B 57/04* | (2006.01) |

(52) U.S. Cl.
CPC .............. *B65B 61/14* (2013.01); *B23P 19/04* (2013.01); *B65B 57/04* (2013.01); *Y10T 29/49826* (2015.01); *Y10T 29/5136* (2015.01); *Y10T 29/5137* (2015.01)

(58) Field of Classification Search
CPC ......... B65B 61/14; B65B 61/16; B65B 57/04; B23P 19/04; Y10T 29/49826; Y10T 29/5136; Y10T 29/5137; B65D 65/46

USPC ........ 53/134.1, 136.1, 136.4, 136.5; 493/226
See application file for complete search history.

(56) References Cited

U.S. PATENT DOCUMENTS

| | | | | |
|---|---|---|---|---|
| 3,373,476 A | * | 3/1968 | Lombardo | B31B 50/00 29/774 |
| 3,484,515 A | * | 12/1969 | Linda | B65B 61/14 264/242 |
| 3,525,137 A | * | 8/1970 | Linda | B65B 61/14 29/564.2 |
| 3,585,702 A | * | 6/1971 | Linda et al. | B65B 61/14 29/243.54 |

(Continued)

*Primary Examiner* — Bayan Salone
(74) *Attorney, Agent, or Firm* — Katten Muchin Rosenman LLP

(57) ABSTRACT

Embodiments of the present invention relate to an apparatus and method for high speed automated installation or attachment of preformed handles onto portable containers such as buckets, boxes, cartons, or pails that are moving on a conveyor system through the apparatus. A frame structure supports the apparatus. A container conveyor conveys the portable containers into and out of the apparatus. A handle sheet conveyor conveys sheets of preformed handles from storage containers into a handle magazine. Individual handles are detached from the preformed handle sheets, after which the handles are attached onto the portable containers at a high rate of speed. A slidable handle separation and insertion mechanism includes a main slide for preforming the handles prior to insertion onto the portable containers. In some embodiments the main slide is angled at approximately a 45 degree angle from the horizontal.

13 Claims, 9 Drawing Sheets

(56) References Cited

U.S. PATENT DOCUMENTS

| | | | | |
|---|---|---|---|---|
| 3,597,827 A | * | 8/1971 | Fries, Jr. | ............... B65B 61/14 |
| | | | | 29/564.2 |
| 3,631,584 A | | 1/1972 | Walkup | |
| 3,774,285 A | * | 11/1973 | Hidding | ............... B65B 61/14 |
| | | | | 29/564.2 |
| 5,079,829 A | * | 1/1992 | Yoshiji | ............... B23P 19/001 |
| | | | | 29/563 |
| 5,524,336 A | | 6/1996 | Gibas | |
| 5,566,436 A | * | 10/1996 | Hirata | ................ B23P 19/02 |
| | | | | 29/240 |

* cited by examiner

APPARATUS AND METHOD FOR AUTOMATED HANDLE INSTALLATION

CROSS REFERENCE TO RELATED APPLICATION(S)

This application claims the benefit of U.S. provisional application No. 62/192,226, filed Jul. 14, 2015, which is incorporated by reference as if fully set forth.

FIELD OF INVENTION

The present invention relates to tools for installation of handles, and more particularly, to an apparatus and method for automated installation or attachment of handles to portable containers.

BACKGROUND

During manufacture of portable containers such as buckets or pails, there is a need for attachment of various types of handles to the containers, as one of the final manufacturing steps. The present invention accomplishes this objective. The invention is an apparatus and method that installs or attaches handles to portable containers moving at high speed in the vicinity of the apparatus.

SUMMARY

Embodiments of the present invention relate to an apparatus and method for high speed automation of the installation or attachment of preformed handles onto portable containers such as buckets, boxes, cartons, or pails moving on a conveyor through or near the invention. Embodiments of the invention include a number of novel and useful features, including but not limited to: the ability to remove handle sheets from shipping boxes or shipping containers that they arrive in; maintaining the handles connected together in handle sheets until the insertion or installation step; separating the handles from the handle sheets by a cutting or knife action, so that the knife or cutter makes a clean cut, and no burrs remain on the handles at the points of separation from the sheets; preforming the handles so that they are waiting for the containers to be positioned for installation of the handles; installing the handles at approximately a 45 degree angle to utilize the geometry of the rosebud(s) on the handles and utilize the rectangular holes on the ears of the containers, to thereby minimize damage to the handles or the ears; and installation of the handles at approximately 45 degrees allows the invention to process the containers while at an in-line orientation, thus allowing the invention to attach handles at high rate of speed.

In one embodiment of the invention, a sheet pick and place assembly within the invention transfers sheets of preformed handles from their shipping containers to a magazine in the apparatus. The magazine allows for receiving the handle sheets and for presenting the handle sheets to a handle separation and insertion assembly. The handle separation and insertion assembly includes a slidable fixture. The slidable fixture includes a main plate and performs a variety of functions, including preforming the handle prior to insertion onto the container.

A handle detachment mechanism includes knives or blades mounted on captor blocks to provide a cutting action to separate individual handles from the handle sheet. The handle prior to cutting is clamped to a mandrel (anvil) by means of two clamp cylinders to secure the handle once it is separated from the handle sheet. A handle attachment mechanism includes the main slide that extends downward from the magazine to receive the individual handle. The downward action draws the handle over a mandrel and seats the "ears" of the handle into the handle separation and insertion assembly so that the handle is bent into an "n" shape. The handle is then positioned properly so that it can be inserted onto the portable container.

In some embodiments the main slide is angled at approximately a 45 degree angle from the horizontal, thus properly positioning the rosebud of the handle to correctly match up with the receptacle or ears of the portable container. The portable container has ears located on the circumference of the container 180 degrees apart. The ears protrude out thus providing connection points for the handle to get attached.

An infeed conveyor uses differential belts or differential tracks and an ear rail to present the portable containers to the handle attachment station so that the ears of the portable container are perpendicular to the direction of movement of the container. The portable container spins until the ear comes into contact with an ear rail. Once released from the ear rail, the portable container comes to a stop against ear stops at the handle insertion station.

With the handle and container in position, insertion cylinders located on either side of the handle separation and insertion assembly extend, pushing the rosebud of the handle into the ear of the container. Once the handle is inserted, the insertion cylinders and ear stop holding the container retract and the cycle starts over again.

These and other features and advantages, which characterize the present non-limiting embodiments, will be apparent from a reading of the following detailed description and a review of the associated drawings. It is to be understood that both the foregoing general description and the following detailed description are explanatory only and are not restrictive of the non-limiting embodiments as claimed.

BRIEF DESCRIPTION OF THE DRAWING(S)

The foregoing Summary as well as the following detailed description will be readily understood in conjunction with the appended drawings which illustrate embodiments of the invention. In the drawings.

DETAILED DESCRIPTION OF ILLUSTRATIVE EMBODIMENT(S)

Embodiments of the present invention 10 relate to an automated apparatus and method for installing, attaching, or inserting preformed handles onto portable containers such as buckets, boxes, cartons, or pails moving on a conveyor near or within the invention. Various embodiments are described more fully below with reference to the accompanying drawing figures, which form a part hereof, and which show specific exemplary embodiments. However, embodiments may be implemented in many different forms. Embodiments should not be construed as limited to the exemplary embodiments described herein; rather, these embodiments are provided so that this disclosure will be thorough and complete, and will fully convey the scope of the embodiments to those skilled in the art.

FIG. 1

Figure 1:
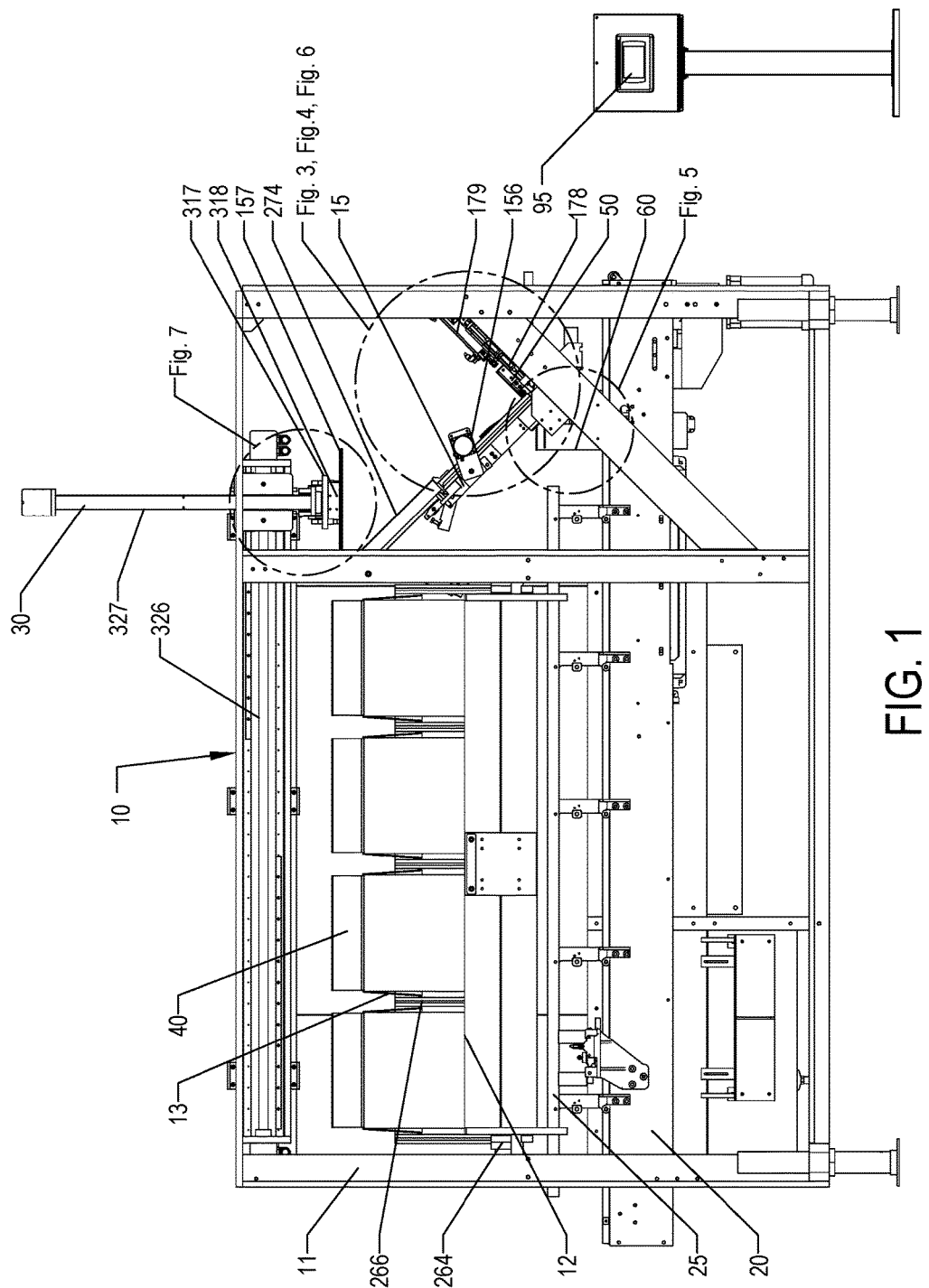
FIG. 1 is a front view illustrating one embodiment of an apparatus for automated handle insertion.
Figure 5:
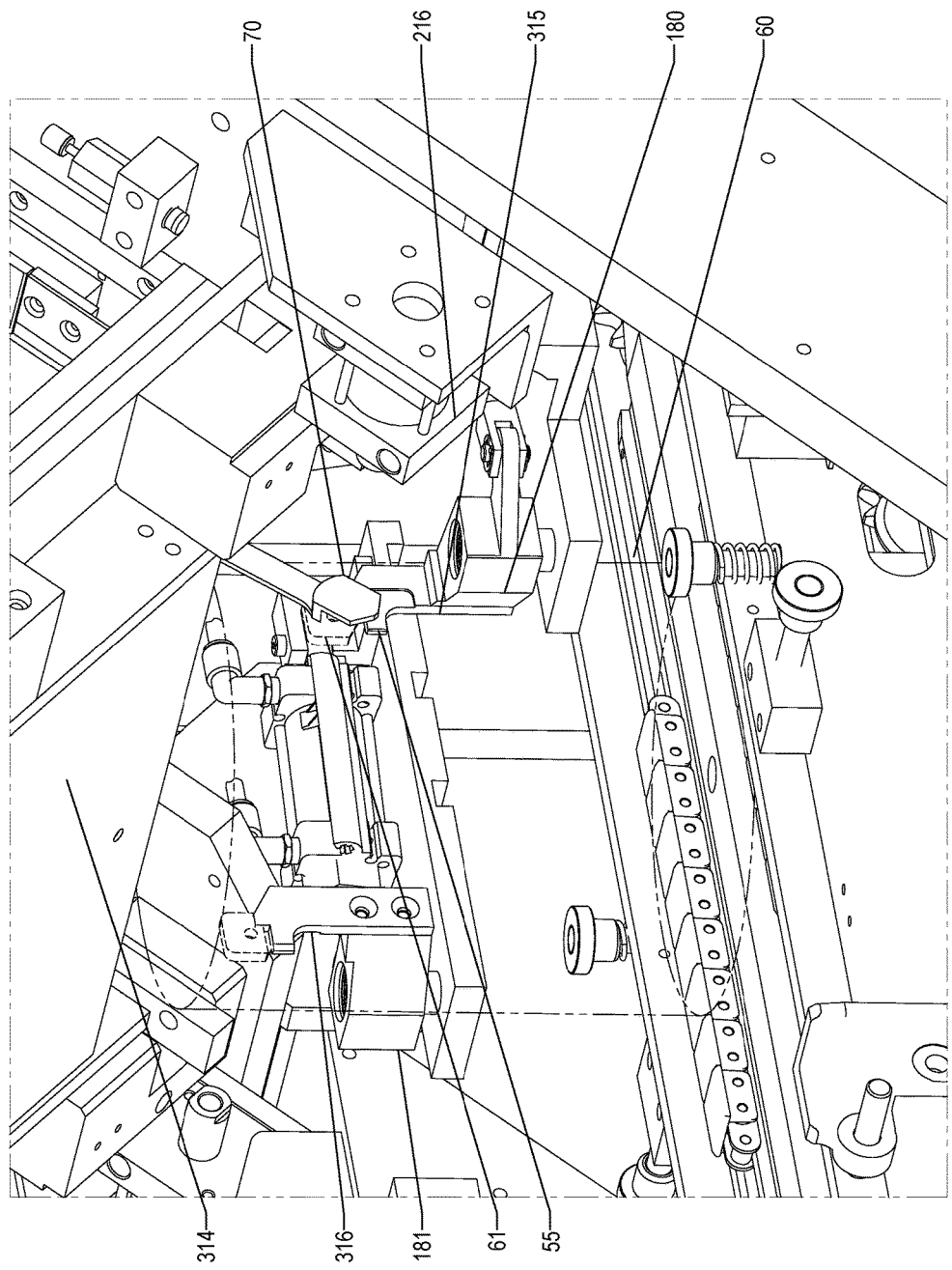
FIG. 5 is a partial perspective view illustrating one embodiment of the earstop and insertion assembly of the invention.

In FIG. 1 is illustrated a front view of the apparatus for automated handle insertion 10. The invention 10 automatically attaches or inserts handles 70 onto discrete, portable containers 60 (FIG. 5). The handle separation and insertion assembly 50 serves as a handle detachment mechanism and also as a handle attachment mechanism by installing handles 70 onto portable containers 60. The portable containers 60 might comprise buckets, pails, cans or other types of portable containers to which handles 70 need to be attached. In some embodiments of the invention 10 the handles 70 may be comprised of flexible materials such as various plastic materials.

All components of the invention 10 are mounted in a sturdy frame structure 11. An infeed conveyor assembly 20 conveys portable containers 60 within or proximate to the invention 10. The infeed conveyor assembly 20 uses differential belts or differential tracks 35,36 (FIG. 4) and at least one ear rail 25 to present the portable containers 60 to the handle attachment station so that the ears of the portable container 60 are perpendicular to the direction of movement of the container 60. The portable container 60 spins until the ear comes into contact with an ear rail 25. Once released from the ear rail 25, the portable container 60 comes to a stop against ear stops 315,316 (FIG. 8) at the handle insertion station The invention 10 will attach at least one handle 70 onto each portable container 60. The portable containers 60 enter and exit the frame structure 11 on the conveyor assembly 20 that extends along a horizontal axis of the frame structure 11. One or more sheet containers 40 are positioned proximate to each other on a rack. Any number of handle sheets 157 (FIG. 3) are stacked vertically in each sheet container 40. In some embodiments of the invention 10, the sheet containers 40 may comprise shipping boxes.

A shelf 12 serves as a storage area for handle sheet containers and aids in the loading and unloading of the handle sheet containers 40. A partition 266 keeps the box flaps 13 on the handle sheet containers 40 folded down so that the tops of the handle sheet containers 40 are open and unobstructed. A box flap 13 identifies the portion of the handle sheet container 40 that the partition 266 is in contact with. A partition base 264 positions handle sheet containers 40 in the correct position for the removal of handle sheets 157 by the sheet pick and place assembly 30.

The sheet pick and place assembly 30 (FIG. 7) moves in a linear motion along a horizontal axis of the frame structure 11. The sheet pick and place assembly 30 removes handle sheets 157 one by one from the sheet containers 40 they are stored in. After removing a handle sheet 157, the sheet pick and place assembly 30 deposits the handle sheet 157 in the dump tray 274 (FIG. 1) in an approximately horizontal position.

The dump tray 274 receives handle sheets 157 from the sheet pick and place assembly 30 in the approximately horizontal position. The dump tray 274 then adjusts itself to an inclined position to facilitate feeding the handle sheets 157 to the separation and insertion assembly 50.

Also visible in the separation and insertion assembly 50 are part of the clamp cylinders 179 that hold a handle 70 in position as it is being preformed. The servo cylinder 327 on the sheet pick and place assembly 30 is visible. The belt driven cylinder 326 serves to move the servo cylinder 327 forward and backward.

In the separation and insertion assembly 50, the motor 156 and the handle sheet magazine 15 that receives handle sheets 157 are visible.

FIG. 2

Figure 2:
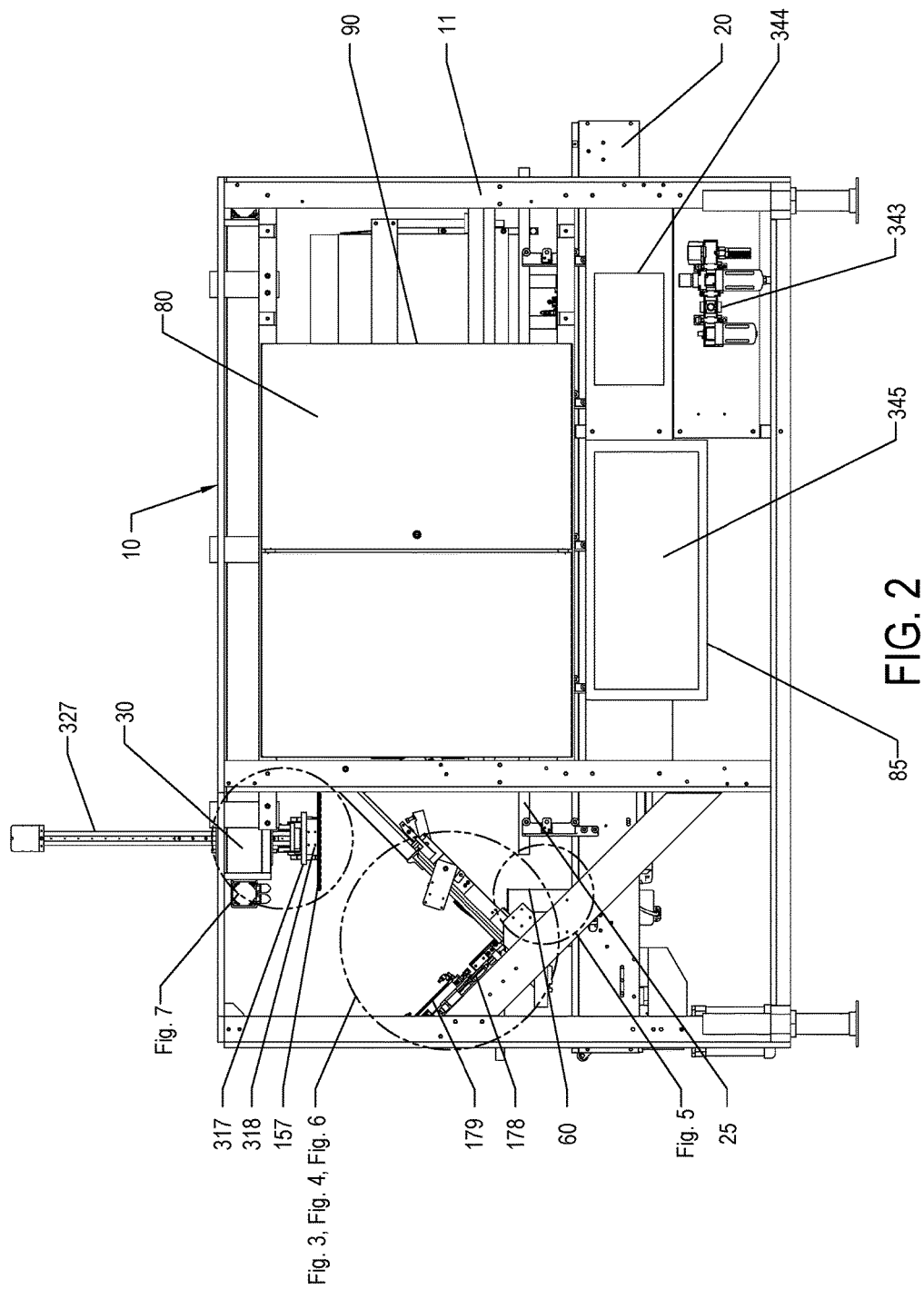
FIG. 2 is a rear view illustrating one embodiment of an apparatus for automated handle insertion.

In FIG. 2 is illustrated a rear view of the apparatus for automated handle insertion 10. The portable containers 60 enter and exit the frame structure 11 on the conveyor assembly 20 that extends along a horizontal axis of the frame structure 11. The apparatus 10 is controlled by a programmable logic controller (PLC) 90 (not shown) contained in the electrical cabinet 80. Various cylinders in the invention 10 are actuated by pneumatic hoses and valves 85 installed in the enclosure 345 supported by the frame structure 11.

The servo cylinder 327 on the sheet pick and place assembly 30 is visible. Also visible are the clamp cylinders 179 that hold a handle 70 in position as it is being preformed. The linear rail assembly 178 is visible. The pickup plate 317 and the pickup jaws 318 are visible. Pick up jaws 318 serve to engage the handle sheets 157.

Figure 7:
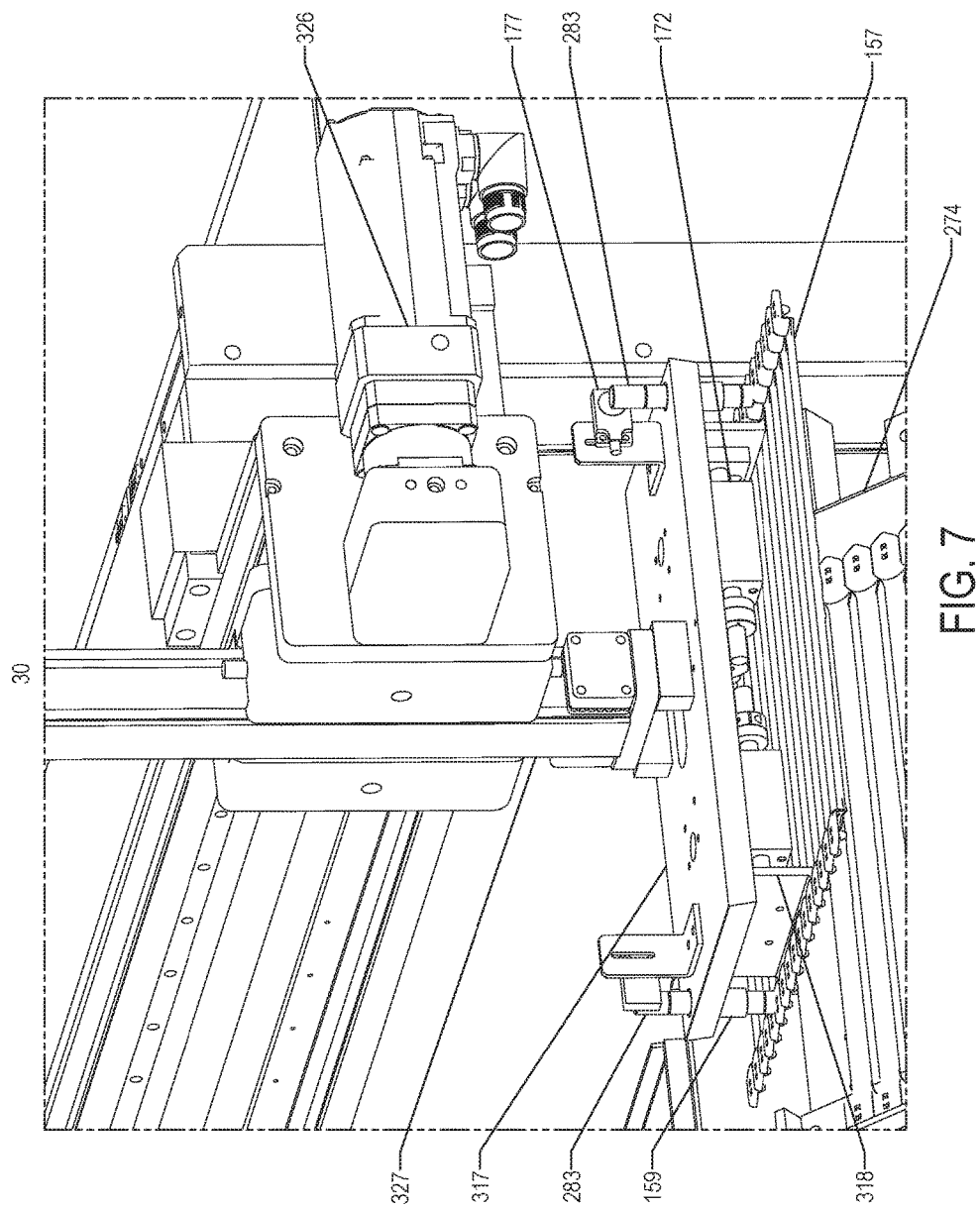
FIG. 7 is a partial perspective view illustrating one embodiment of the sheet pick and place assembly of the invention.

The air service unit 343 serves the functions of filtering, regulation, and lubrication in the pneumatic system. The isolated handle gripper valve 344 serves to actuate the handle gripper cylinder 172 (FIG. 7). The pneumatic valve bank 85 actuates various pneumatic components.

In some embodiments of the invention 10, a programmable logic controller (PLC) 90 is responsible for the overall sequence of operations of the invention 10 as well as monitoring the status of the components by use of sensors, including in various embodiments inductive, laser distance measuring, fixed field, and retro reflective sensors.

Figure 6:
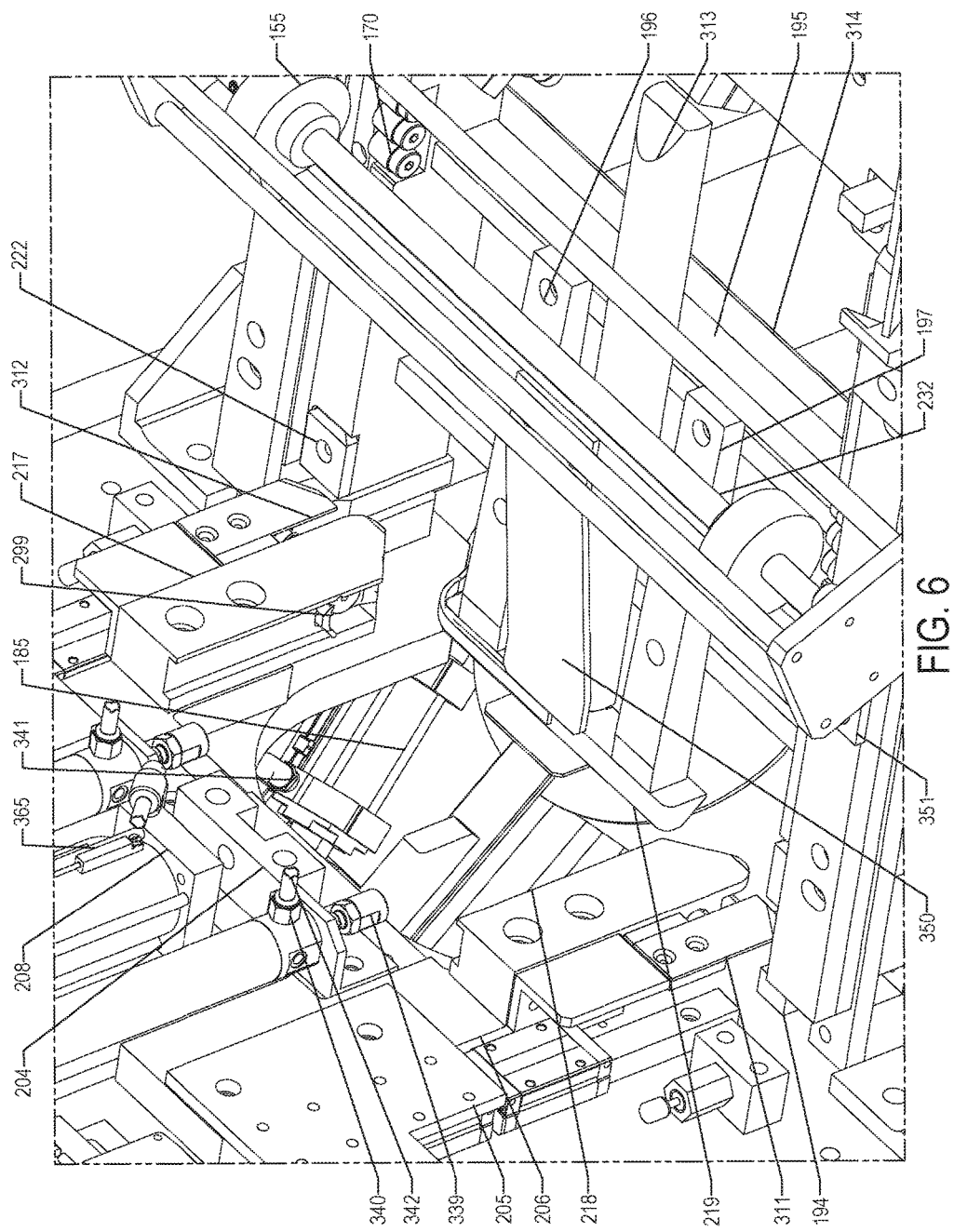
FIG. 6 is a partial front perspective view illustrating one embodiment of the handle separation and insertion assembly of the invention.
Figure 8:
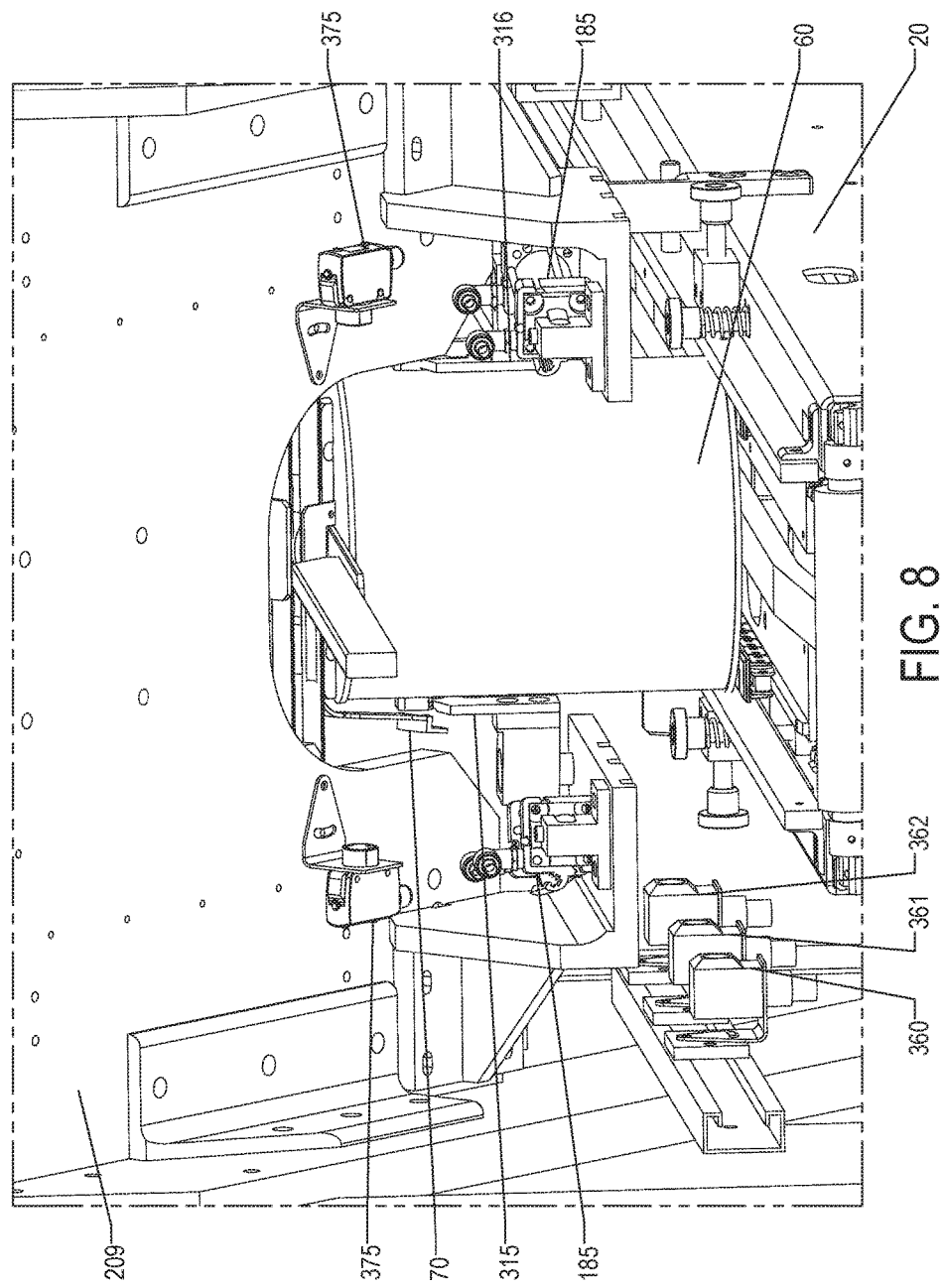
FIG. 8 is a partial rear perspective view illustrating one embodiment of the handle separation and insertion assembly of the invention.

The PLC 90 sequence of operations begins with the presence of the handle sheet 157 at the handle separation and insertion section 50 (FIG. 1), as detected by the two laser sensors 338 (FIG. 4), and with the presence of a portable container at reflective sensor 362 (FIG. 8). Reflective sensor 362 is located upstream from the handle insertion station 50 and signals to begin the process of cutting and preforming the handle prior to the portable containers actual arrival at the earstops 315,316 (FIG. 5). Detection of the handle 70 by sensors 338 and detection of a portable container 60 by reflective sensor 362, starts the separation of the handle 70 from the handle sheet 157. This is accomplished by the slider 206. The slider 206 is moved to position the captors 217,218 to engage the handle and provide the cutting action by the cutting blades 311,312 (FIG. 6). The slider 206 is moved by cylinder 208 when a valve on bank 85 (FIG. 2) is actuated. When the slider 206 reaches the extended length of the cylinder stroke, an inductive sensor 365 mounted on the cylinder 208 will indicate to the PLC that the Slide 206 is in position to insert the handle onto the container 60. The slide 206 in the extended position and the portable container 60 detected by reflective sensor 360 (FIG. 8) triggers the insertion cylinders 216 (FIG. 5) to actuate, inserting the handle 70 into the portable container 60. At the same time the handle clamp cylinders 179 (FIG. 4) are retracted and the ear stop cylinders 185 (FIG. 6) are released, allowing the handle 70 to come free of the anvil 219 and the portable container 60 to move forward clearing the apparatus 10.

A portable container 60, upon clearing the reflective sensor 361 (FIG. 8) on the conveyor assembly 20, resets the earstops 315,316 (FIG. 5) as well as the slider 206. When the slider 206 reaches the top or the retracted position of the cylinder 208, the inductive sensor 370 mounted on the top of the slider cylinder 208 is detected, and the clamp cylinders 179 extend setting up the next cycle to begin. The handle sheets 157 are supplied by the sheet pick and place assembly 30, the function of which is sequenced by the PLC 90 as well. Signals are supplied from the sheet pick and place horizontal axis as to its position allowing the pick-up plate 317 (FIG. 7) to stop at one of five positions; sheet container 4, sheet container 3, sheet container 2, sheet container 1 and loading. The vertical position of cylinder 327 as well as the gripper cylinders 172 are controlled by the flag 283 by sensors 177. The flag 283 also indicates the successful engagement of the handle sheet 157. The fix field sensor (not shown) located at the bottom of each handle sheet container 40 ensures that a sheet container 40 is present to allow picking handle sheets 157 from that container.

FIG. 3

Figure 3:
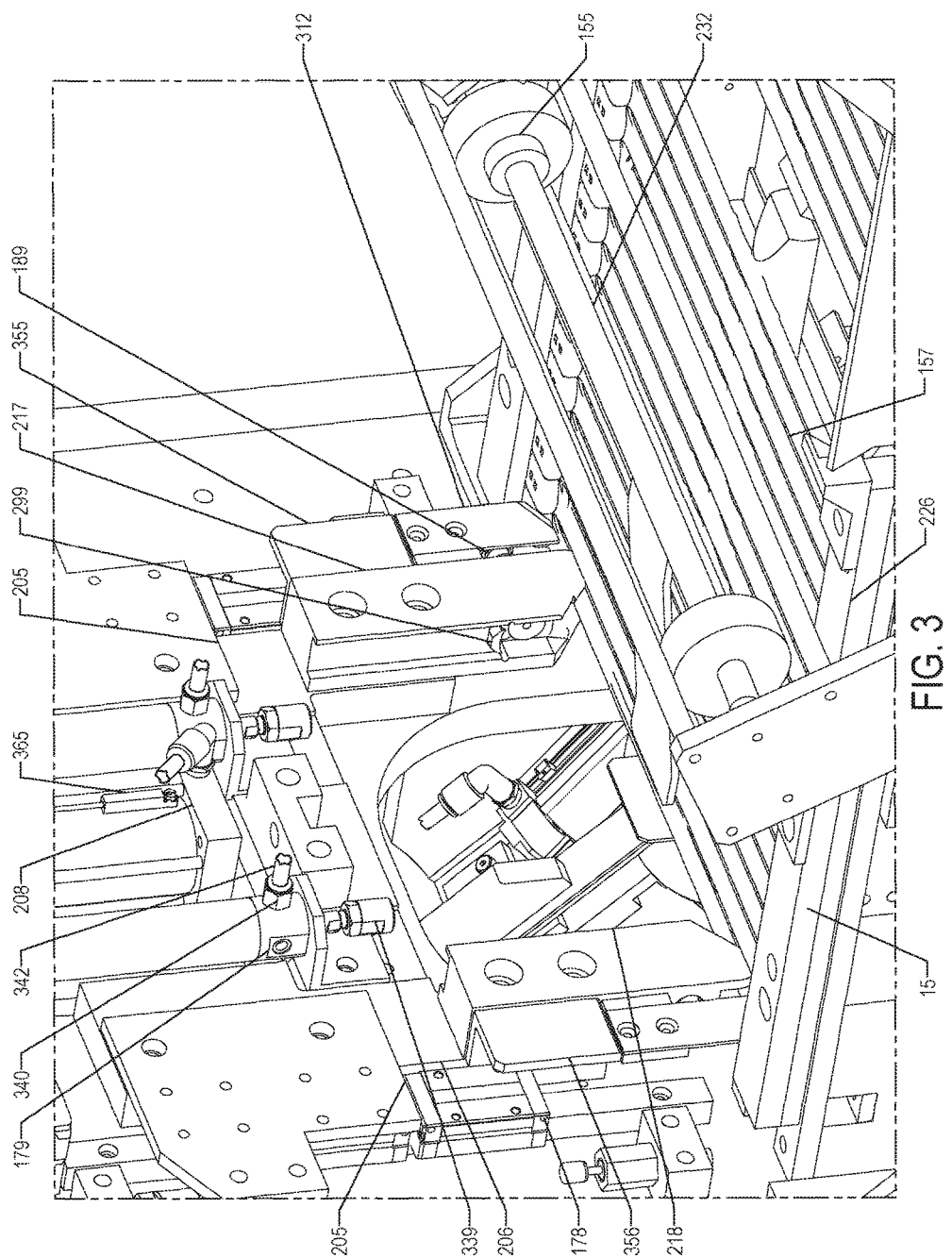
FIG. 3 is a partial perspective view illustrating one embodiment of the handle separation and insertion assembly of the invention.

In FIG. 3 is illustrated a partial view of the handle separation and insertion assembly 50 with a handle sheet 157 in place.

The linear rail assembly 178 guides the slider 206 in substantially linear motions approaching and receding from the handle sheets 157.

The slider 206 provides the approaching and receding linear motion for the right captor 217 and the left captor 218 to deliver a handle 70 to the correct position where it can be inserted or attached onto a portable container 60.

The slider 206 also contains the handle clamp cylinders 179 as well as the slider cylinder 208 (FIG. 4), that are used to produce the up and down motion. The slider mounting plate 205 attaches the slider 206 to the linear rail assembly 178 used to guide the slider 206 while it approaches and recedes while attaching the handles 70 to portable containers 60. The right ramp 225 and the left ramp 226 guide the handle sheet 157 in the direction of the separation and insertion assembly 50 of the invention 10.

At least two projecting arms, a right captor 217 and a left captor 218, include partially enclosed channels at their distal ends that are configured to constrain and guide a handle 70 within the enclosed channels, prior to the handle 70 being inserted onto a portable container 60. The captors 217,218 engage the separated handles 70 from the handle sheet 157 and press the handles 70 over the anvil 219 so that the handles 70 are in the correct position for insertion or attachment to a portable container 60. The anvil 219 holds the top of the handle 70 in position as the captors 217,218 press the handle 70 ends and shape the handle 70 prior to inserting or attaching the handle 70 onto a portable container 60. The anvil 219 also provides a surface for the clamp cylinders 179 to hold the handle 70 in position on the anvil 219 as it is being preformed. Clamp buttons 339 are used to hold the handle 70 in position on the anvil 219 while the captors 217,218 preform the handle.

The plunger 299 is mounted in the captors 217,218. It is extended by means of a cylinder 216 to drive the handle 70 out of the captors 217,218 and insert it onto a portable container 60. The plunger 299 returns by means of a spring 189.

The blade holders 355,356 serve to mount the blades 311,312 (FIGS. 3, 6). The blades 311,312 cut one handle 70 free from the rest of the handle sheet 157 so that the preformed handle 70 is ready for insertion or attachment onto a portable container 60. The blade holders 355,356 are mounted to the captors 217,218. The blades 311,312 move in linear motions approaching and receding from the handle sheet 157, thereby driving the blades 311,312 to separate a handle 70 from the handle sheet 157.

The handle sheet magazine 15 receives handle sheets 157 comprised of a plurality of individual handles 70 connected together in sheet form. The slide cylinder 208 provides linear motion in two directions for the slider 206. The circular brush 155 assists in feeding the handle sheet 157 to the separation and insertion assembly 50. The shaft roller 232 serves to drive and mount the circular brushes 155.

A pneumatic straight fitting 340, a pneumatic elbow fitting 341 and pneumatic tubing 342 provide pneumatic connections to certain cylinders that are actuated by pneumatic pressure.

FIG. 4

Figure 4:
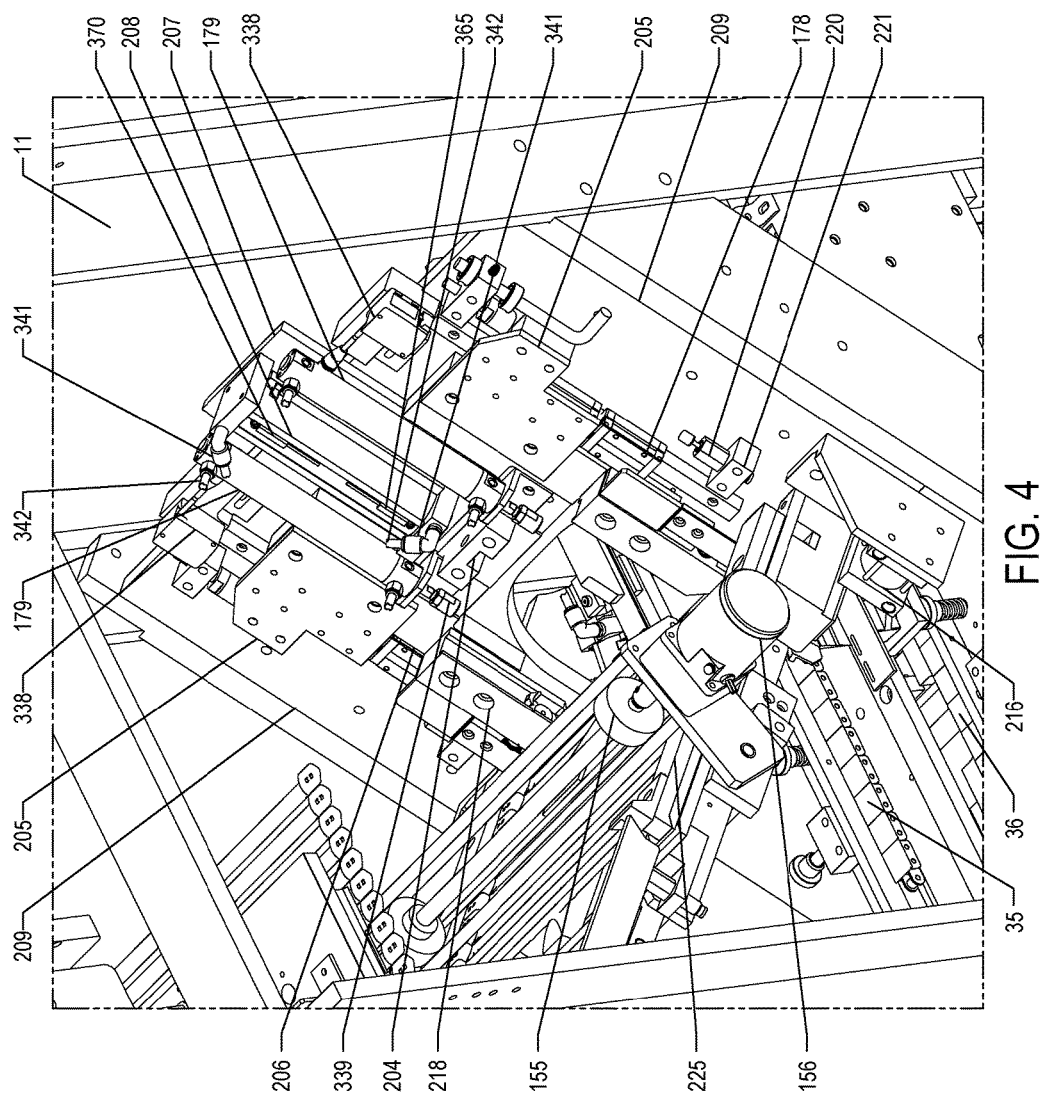
FIG. 4 is a partial perspective view illustrating one embodiment of the handle separation and insertion assembly of the invention.

In FIG. 4, the major components of the invention 10 are mounted on the frame structure 11 using the main plate 209. The captors 217,218 (FIGS. 3,4,6) serve to mount the blade holders 355,356 and the blades 311,312. The slider mounting plate 205 attaches the slider 206 to the linear rail assembly 178. The captors 217,218 engage the separated handles 70 from the handle sheet 157 and press the handle 70 over the anvil 219 so that the handle 70 is in the correct position for insertion or attachment to a portable container 60. The rod block 204 connects the slider 206 to the slide cylinder 208. The slide cylinder 208 provides linear motion in two directions for the slider 206. The major components of the invention 10 are mounted on the frame structure 11 using the main plate 209.

The slider 206 provides the approaching and receding linear motion for the right captor 217 and the left captor 218 to deliver a handle 70 to the correct position where it can be inserted or attached onto a portable container 60. The slider 206 also contains the clamp cylinders 179 as well as the slider cylinder 208, that are used to produce an advancing and receding motion.

The circular brush 155 is powered by the motor 156. The circular brush 155 assists in feeding the handle sheet 157 to the separation and insertion assembly 50. The ramp guides 225,226 contain and guide the handle sheet 157 into the separation and insertion assembly 50 section.

The earstops 315,316 stop movement of the portable container 60 by means of an ear 61 located on each container 60. The earstops 315,316 correctly position the container 60 for attachment or insertion of a handle 70 from the captors 217,218. The earstops 315,316 also provide support for the container ear while the handle is inserted by means of a tab 55 that extends outward. The earstops 315,316 are retractable to allow the container to continue forward after the handle 70 is attached or inserted.

The linear rail assembly 178 guides the slider 206 in substantially linear motions approaching and receding from the handle sheets 157. The spring 189 is used to return the plunger 299 to its home position.

The plunger 299 is mounted in the captors 217,218. It is extended by means of a cylinder 216 to drive the handle 70 out of the captors 217,218 and insert it onto a container 60. The plunger 299 returns by means of a spring 189.

The rod block 204 connects the slider 206 to the slide cylinder 208. The right ramp 225 and the left ramp 226 guide the handle sheet 157 in the direction of the separation and insertion assembly 50 of the invention 10. The earstops 315, 316 correctly position the portable container 60 for attachment or insertion of a handle 70 from the captors 217,218.

One or more laser sensors 338 are mounted on the slider mounting plate 205. The laser sensors 338 detect that the handle sheet 157 is in the correct position in the separation and insertion assembly 50 by use of a laser 338 that is distance based. If the handle sheet 157 is not in the correct position, the laser 338 will not sense the handle sheet 157, preventing the machine from cycling. An alarm condition will be displayed on the operator interface 95 (FIG. 9) when the portable container 60 is in position for insertion and the handle sheet 157 has not been detected.

A pneumatic straight fitting 340, a pneumatic elbow fitting 341 and pneumatic tubing 342 provide pneumatic connections to certain cylinders.

FIG. 5

In FIG. 5 is illustrated the earstop and insertion assembly. The earstops 315,316 stop movement of the container 60 by means of an ear 61 located on each container 60. The earstops 315,316 correctly position the portable container 60 for attachment or insertion of a handle 70 from the captor 217,218. The earstops 315,316 also provide support for the container ear while the handle 70 is inserted by means of a tab 55 that extends outward. The earstops 315,316 are retractable to allow the portable container to continue forward after the handle 70 is attached or inserted.

The earstop arms 180,181 serve to mount the earstops 315,316 and connect them to the cylinder 185. The cylinder 185 serves to actuate the earstops 315,316. The plunger 299 is extended by means of a cylinder 216 to drive the handle 70 out of the captors 217,218 and insert it onto a container 60. A cover plate 314 is used to prevent etching by the laser beam below the plate.

FIG. 6

In FIG. 6 is illustrated a perspective view of the handle separation and insertion assembly 50 without a handle sheet 157 in place. The handle cup guide 194 serves as a backstop to position the handle sheet 157 correctly for the separation of one individual handle 70. The slider 206 moves in substantially linear motions approaching and receding from the handle sheets 157. The slider 206 provides the approaching and receding linear motion for the right captor 217 and the left captor 218 to deliver a handle 70 to the correct position. The slider mounting plate 205 attaches the slider 206 to the linear rail assembly 178.

The anvil 219 holds the top of the handle 70 in position as the captors 217, 218 press the handle 70 ends and shape the handle 70 prior to inserting or attaching the handle 70 onto a container 60. The anvil 219 also provides a surface for the clamp cylinders 179 to hold the handle 70 in position as it is being preformed. The bar anvils 196,197 serve as a guide to support the handle sheet 157 as well as a mounting means for the anvil 219. The cylinder 185 serves to actuate the earstops 315,316. The rod block 204 connects the slider 206 to the slide cylinder 208.

The insert 222 serves as a shear edge to support the handle sheet 157 as it is being cut by the blades 311,312. The bearing needle 170 serves to provide a rolling backup surface to the circular brushes 155. The bar sheet support 313 serves to support the bottom of the handle sheet 157. The bar anvils 196,197 serves as a guide to support the handle sheet 157 as well as a mounting means for the anvil 219.

Clamp buttons 339 are used to hold the handle 70 in position on the anvil 219 while the captors 217,218 preform the handle. A pneumatic straight fitting 340, a pneumatic elbow fitting 341 and pneumatic tubing 342 provide pneumatic connections to actuate certain cylinders.

The plunger 299 is mounted in the captors 217,218. The circular brush 155 assists in feeding the handle sheet 157 to the separation and insertion assembly 50. The shaft roller 232 serves to drive and mount the circular brushes 155. The shaft roller 232 is driven by the drive motor 156. The bearing needle 170 serves to provide a rolling backup surface to the circular brushes 155.

FIG. 7

In FIG. 7 is illustrated a partial view of the sheet pick and place assembly 30. The sheet pick and place assembly 30 moves in a linear motion along a horizontal axis of the frame structure 11. The sheet pick and place assembly 30 removes handle sheets 157 one by one from the sheet containers 40 they are stored in. After removing a handle sheet 157, the sheet pick and place assembly 30 deposits the handle sheet 157 in the dump tray 274 in an approximately horizontal position.

The pickup plate 317 serves to mount the handle sheet gripper cylinders 172, the flag guide bushings 159, the flag 283, and the sensors 177. The belt driven cylinder 326 moves the servo cylinder 327 forward and backward. The servo cylinder 327 raises and lowers the handle gripper pickup plate 317. The belt driven cylinder 326 is actuated by means of a position controller and the PLC 90.

The flag 283 serves to stop the motion of the "Y" axis of the sheet pick and place assembly 30. The flag 283 is driven upward as the "Y" axis is going downward when it comes in contact with the handle sheet 157. When the flag is at the correct position the sensor 177 provides an electrical signal to stop the "Y" axis. The sensor 177 senses the presence of the flag 283 to determine the position of the pickup plate 317 and to determine if the handle sheet 157 is in place.

The pickup jaws 318 serve to engage and grasp the handle sheet 157 by applying opposite pressure on the handle sheet ears by means of gripper cylinders 172. Once the pick up jaws 318 actuate and engage and grasp the handle sheet 157, the flag 283 monitors that the handle sheet 157 is in place for transport. The bronze bushing 159 serves to guide the flag 283. The handle sheet gripper cylinder 172 serves to drive the pick up jaws 318 outward to engage the handle sheet 157.

During operation of the invention 10, sheet containers 40 containing handle sheets 157 are manually inserted on the shelf assembly 12 mounted in the invention 10. Portable containers 60 are placed on the infeed conveyor assembly 20, which is then activated. Handle sheets 157 are removed one by one from the sheet containers 40 and deposited in the separation and insertion assembly 50, where individual handles 70 are separated from the handle sheets 157. Portable containers 60 enter the invention 10 on the infeed conveyor assembly 20, handles 70 are automatically installed on the portable containers 60 at high speed, and the portable containers 60 exit the invention 10 on the infeed conveyor assembly 20.

FIG. 8.

FIG. 8 illustrates a partial rear perspective view of one embodiment of the handle separation and insertion assembly 50.

In the event that an error occurs during installation of a handle 70 on a portable container 60, the invention 10 will detect the incomplete handle insertion by means of two laser sensors 375 (FIG. 8) located on the back of the mainplate 209 (FIG. 8). These sensors will detect each side of the handle 70 as it exits the insertion area. If one or both sensors do not detect the handle 70, a relay contact closure signal is available to use to reject the container 60 downstream of the invention 10. In event the handle sheets 157 are used up, the invention 10 will stop and park the pick and place assembly 30 in the load position allowing the operator to load new handle sheet containers 40. An indication on the machine operator interface 95 will display that the handle sheet containers 40 are empty. If the invention 10 does not detect a portable container 60 on the infeed conveyor 20, the invention 10 will wait until a portable container 60 comes into position for a handle 70 to be installed. A portable container 60, upon clearing the reflective sensor 361 (FIG. 8) on the conveyor assembly 20, resets the earstops 315,316 (FIG. 5). Reflective sensor 362 is located upstream from the handle insertion station 50 and signals to begin the process of cutting and preforming the handle prior to the portable containers 60 actual arrival at the earstops 315,316 (FIG. 5). Detection of the handle 70 by laser sensors 338 and detection of a portable container 60 by reflective sensor 362 starts the separation of the handle 70 from the handle sheet 157.

The earstop cylinder 185 serves to actuate the earstops 315,316. When retracted, the earstop cylinders 185 close the earstops 315,316, preventing the portable container 60 from passing through the handle separation and insertion assembly 50 before the handle 70 is attached to the portable container 60. Once the handle is attached, the earstop cylinders 185 extend and allow the portable container 60 to proceed from the handle separation and insertion assembly 50. The portable container clears the sensor 361 as it leaves the handle separation and insertion assembly 50, then resets the earstop cylinders 185, so as to stop the next portable container 60 before the handle 70 is attached.

FIG. 9.

Figure 9:
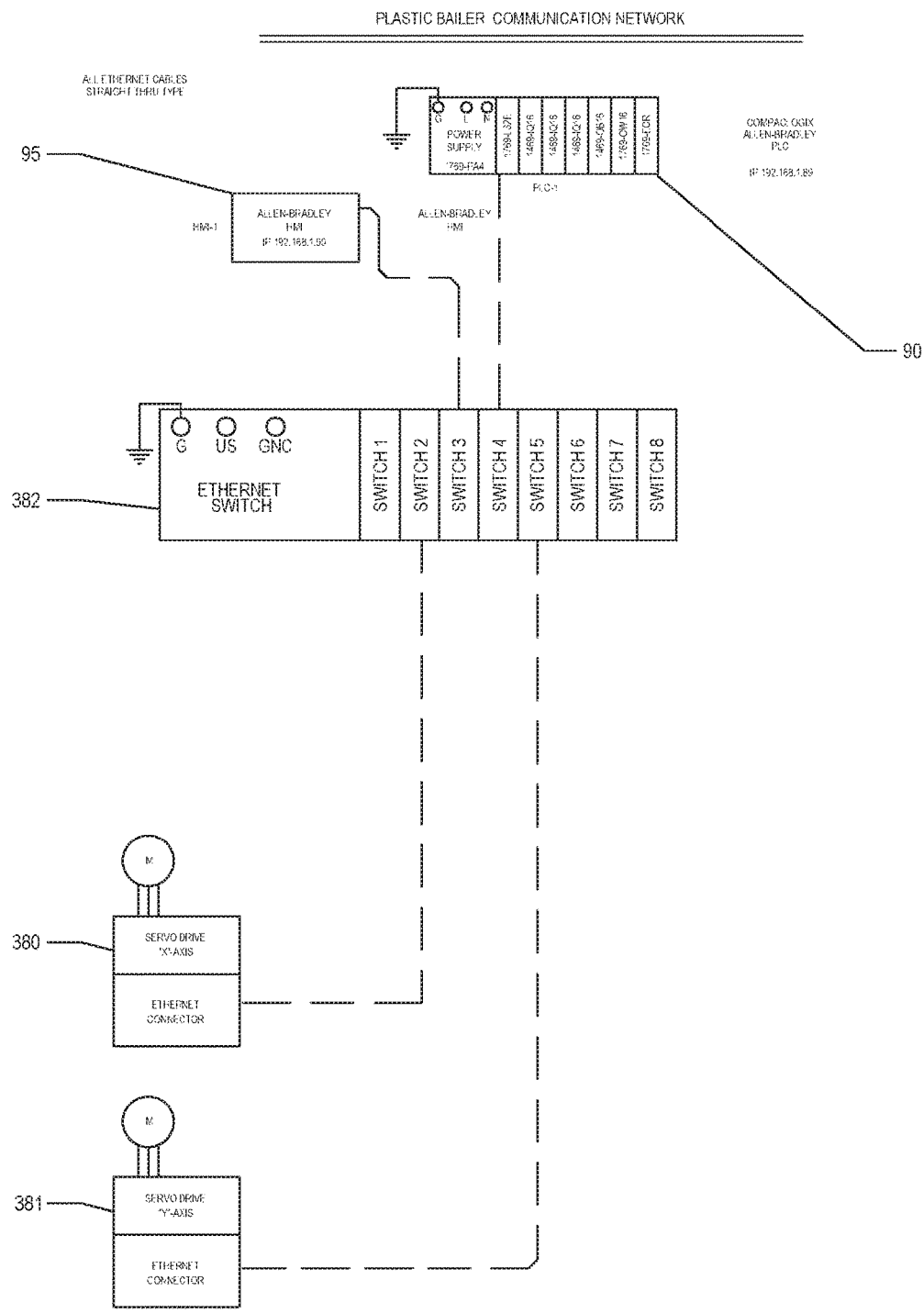
FIG. 9 is a block diagram of the electrical system of the invention.

FIG. 9 illustrates a block diagram of the electrical circuits of the invention. In FIG. 9 the communication diagram is shown to illustrate the connections between devices. The PLC 90 acts as the main device to control the other devices. The Operator interface 95 is used to display status of the machine as well as a way for the operator to control the operation of the invention 10. In some embodiments of the invention, network communication between devices is accomplished with an Ethernet switch 382. The Operator Interface 95 allows operator control of the machine and includes an operator display device and an operator input device (not shown).

The "X" axis servo drive 380 and the "Y" axis servo drive 381 are connected to the PLC 90 by electrical circuits and/or network connections. Electrical signals from the PLC 90 control the actions of the servo drives 380,381. The servo drives 380, 381 also receive commands from the PLC 90 that command the pick and place assembly 30 to move to the appropriate position.

While embodiments of the invention have been described in detail above, the invention is not limited to the specific embodiments described above, which should be considered as merely exemplary illustrations set forth for a clear understanding of the principles of the invention. Further variations, modifications, extensions, or equivalents of the invention may be developed without departing from the scope of the invention. It is therefore intended that the invention not be limited to the particular embodiments disclosed as the best mode contemplated for carrying out this invention, but that the invention will include all the embodiments falling within the scope of the appended claims.

What is claimed is:

1. A handle attachment apparatus, said apparatus comprising:
    a frame;
    a conveyor for portable containers;
    a sheet picker;
    a handle sheet magazine;
    a slidable fixture;
    a detachment mechanism configured to detach preformed handles from handle sheets; and
    an attachment mechanism configured to attach said preformed handles onto connection points of said portable containers;
    wherein said slidable fixture is mounted at a 45 degree angle from horizontal.

2. The apparatus of claim 1, wherein said conveyor further comprises:
    a plurality of differential speed movable tracks configured to convey and rotate said portable containers; and
    at least one ear rail configured to accept a plurality of ears attached to outer surfaces of said portable containers.

3. The apparatus of claim 1, wherein said sheet picker comprises:
    a storage area for handle sheets;
    a pickup arm;
    a pickup plate attached to a proximal end of said pickup arm;
    pickup jaws attached to said pickup arm; and
    sensors to detect positions of said handle sheets.

4. The apparatus of claim 3, further including:
    at least one horizontal track;
    at least one vertical track; and
    whereby said pickup arm moves along said horizontal track and along said vertical track proximate to said sheet containers and proximate to said handle sheet magazine.

5. The apparatus of claim 1, wherein said handle sheet magazine comprises a substantially rectangular tray configured to contain at least one handle sheet.

6. The apparatus of claim 1, further including:
    a plurality of cutting blades extending from said detachment mechanism and configured to detach single preformed handles from said handle sheets.

7. The apparatus of claim 1, further including: a plurality of projecting arms extending from said slidable fixture; and channels on the proximal ends of said projecting arms configured to enclose a single preformed handle.

8. The apparatus of claim 7, further including: an anvil mounted proximate to the distal ends of said projecting arms; clamp cylinders configured to constrain a single preformed handle against said anvil; and a plurality of plungers; whereby said plungers insert the ends of a preformed handle onto said connection points of a portable container.

9. The apparatus of claim 1, further including:
    a plurality of substantially parallel fixture rails; wherein said slidable fixture is configured to slide on said parallel fixture rails.

10. A method for attaching preformed handles onto portable containers, said method comprising the steps of:
    conveying portable containers proximate to an apparatus, said portable containers having ears with connection points attached on their outer surfaces;
    conveying handle sheets into a handle sheet magazine;
    providing a slidable fixture so that said slidable fixture is mounted at a 45 degree angle from horizontal;

providing projecting arms at the distal ends of said slidable fixture;
detaching preformed handles from said handle sheets;
constraining said preformed handles within said projecting arms; and
attaching said preformed handles onto said connection points on said portable containers.

11. The method of claim 10, further comprising the steps of:
conveying said portable containers on a plurality of differential speed movable tracks; and
rotating said portable containers so that said ears are perpendicular to a direction of movement of said portable containers.

12. The method of claim 10, wherein the step of conveying handle sheets further comprises the steps of:
providing at least one horizontal track;
providing at least one vertical track; and
moving a pickup arm along said horizontal track and along said vertical track;
whereby said handle sheets are conveyed from a storage area into said handle sheet magazine.

13. A method for attaching a preformed handle onto a portable container comprising:
conveying the portable container proximate to an apparatus,
wherein each portable container comprises:
a first connection point on a first exterior side of the portable container; and
a second connection point on a second exterior side of the portable container opposite the first side;
conveying a handle sheet into a handle sheet magazine;
constraining a first end and a second end of a preformed handle of the handle sheet using projecting arms of a slidable fixture,
wherein the first end has a first connector and the second end has a second connector;
detaching the preformed handle from the handle sheet;
drawing the preformed handle over a mandrel using the slidable fixture so that the preformed handle forms a u-shape;
extending plungers against the first end and the second end to attach the first connector to the first connection point and the second connector to the second connection point.

* * * * *